(12) United States Patent
Kim et al.

(10) Patent No.: US 7,773,659 B2
(45) Date of Patent: Aug. 10, 2010

(54) UWB MCSK/BPPM WIRELESS COMMUNICATION SYSTEM AND METHOD FOR INCREASED INFORMATION RATE

(75) Inventors: Dong In Kim, Burnaby (CA); Serhat Erkucuk, Burnaby (CA); Kyung Sup Kwak, Incheon (KR)

(73) Assignees: INHA-Industry Partnership Institute, Incheon (KR); Simon Fraser University, Burnaby, B.C. (CA)

( * ) Notice: Subject to any disclaimer, the term of this patent is extended or adjusted under 35 U.S.C. 154(b) by 851 days.

(21) Appl. No.: 11/157,297

(22) Filed: Jun. 20, 2005

(65) Prior Publication Data

US 2006/0268959 A1 Nov. 30, 2006

(30) Foreign Application Priority Data

May 30, 2005 (KR) ........................ 10-2005-0045754

(51) Int. Cl.
 *H04B 1/00* (2006.01)
(52) U.S. Cl. .................. 375/130; 375/134; 375/135; 375/136; 375/138; 375/140; 375/145; 375/146; 375/147; 375/262; 375/341
(58) Field of Classification Search .......... 375/134, 375/135, 136, 138, 140, 145, 146, 147, 262, 375/341
See application file for complete search history.

(56) References Cited

U.S. PATENT DOCUMENTS 5,361,276 A * 11/1994 Subramanian ............. 375/150

7,295,606 B2 * 11/2007 Paquelet ..................... 375/238
2006/0203931 A1 * 9/2006 Orlik et al. .................. 375/295

OTHER PUBLICATIONS

Fumie et al., IEEE; Proposal of a Time-Hopping Modified Multipulse PPM System with Restricted Amplitude Levels, ISSSTA2004, Sydney, Australia, Aug. 30-Sep. 2, 2004, pp. 812-816.*
Craig Mitchell et al., "High Date Rate Transmissions Using Orthogonal Modified Hermite Pulses in UWB Communications", IEEE Transactions on Communications, 2003.
R.A. Scholtz, "Multiple Access with Time-Hopping Impulse Modulation", IEEE Transactions on Communications, 1993.
Dong In Kim , "Combined Binary Pulse Position Modulation/Biorthogonal Modulation for Direct-Sequence Code Division Multiple Access", IEEE Transactions on Communications, 1999.

* cited by examiner

*Primary Examiner*—Shuwang Liu
*Assistant Examiner*—Kabir A Timory
(74) *Attorney, Agent, or Firm*—Bachman & LaPointe, P.C.

(57) ABSTRACT

Disclosed herein is an Ultra WideBand (UWB) M-ary Code Shift Keying (MCSK)/Binary Pulse Position Modulation (BPPM) wireless communication system and method. The system includes a transmitter and a receiver. The transmitter selects a specific TH code using MCSK according to an additional data stream, performs BPPM on a desired signal according to the selected TH code, and transmits the modulated signal via a channel. The receiver receives the signal transmitted from the transmitter via the channel, and estimates the transmitted signal, which is transmitted from the transmitter, through detection of a Maximum Likelihood (ML) sequence.

9 Claims, 13 Drawing Sheets

[Figure 1]
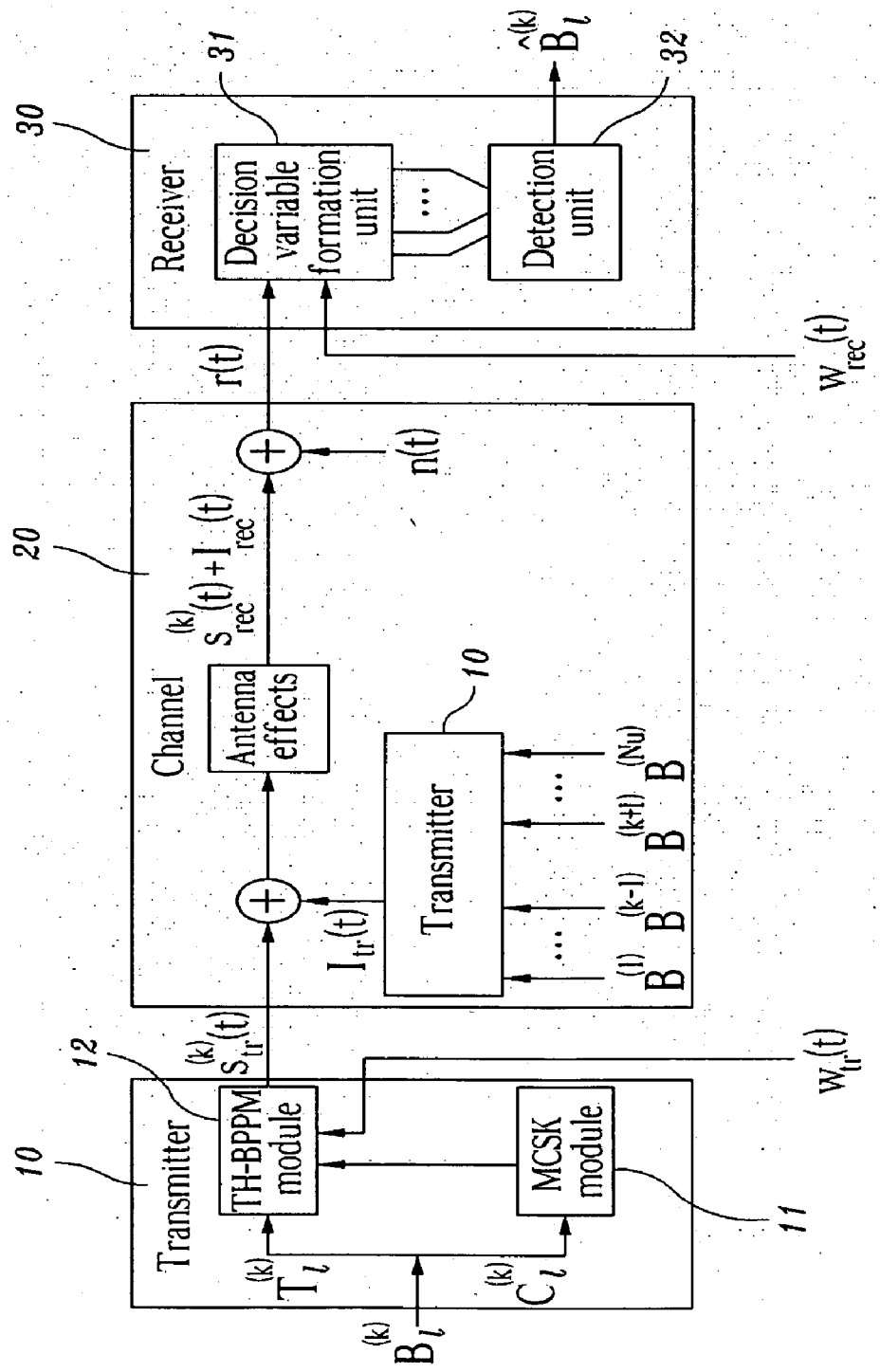

[Figure 2]
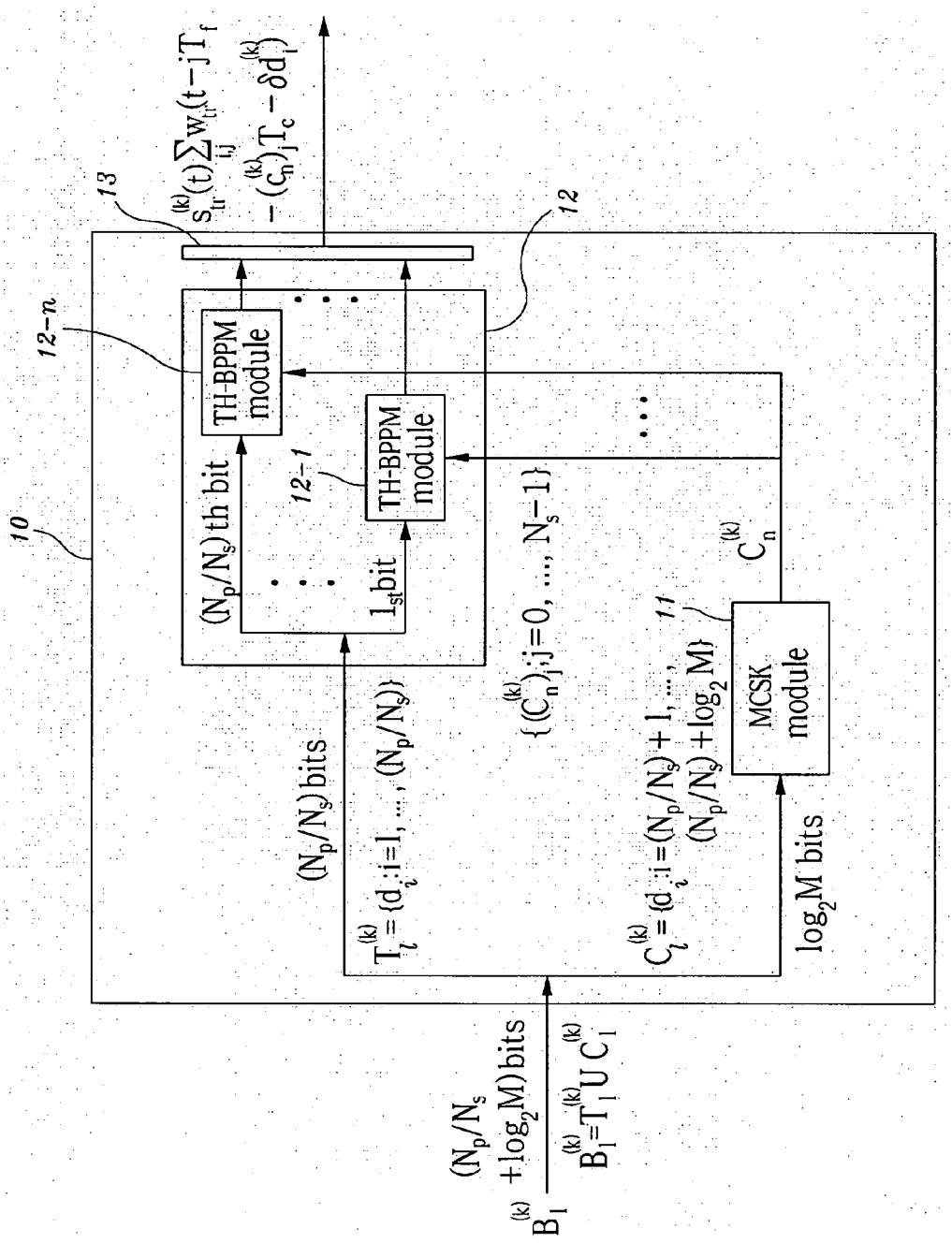

[Figure 3]
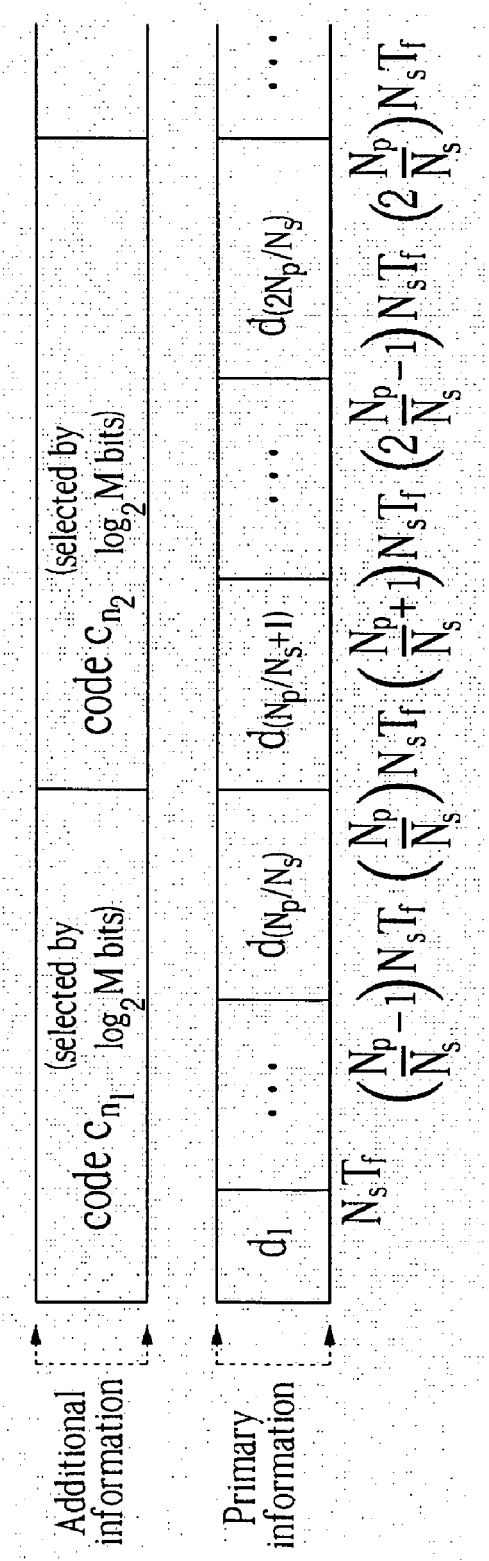

[Figure 4]
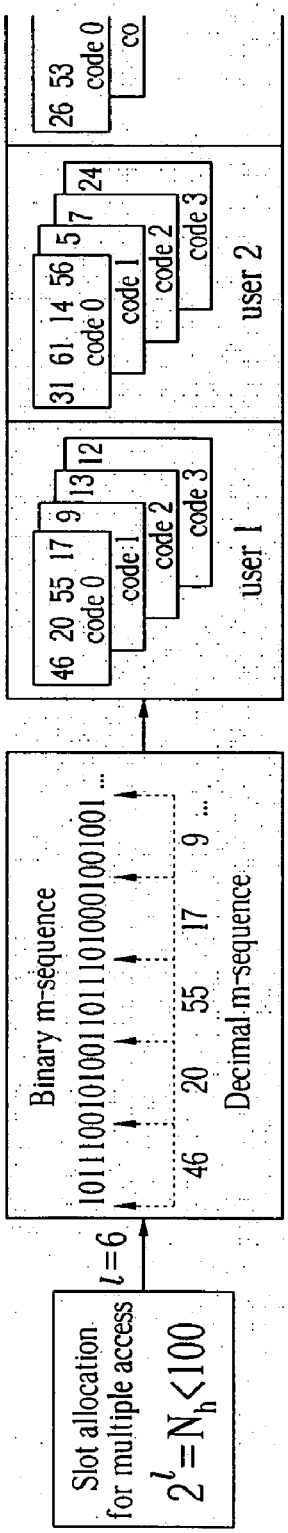

[Figure 5]
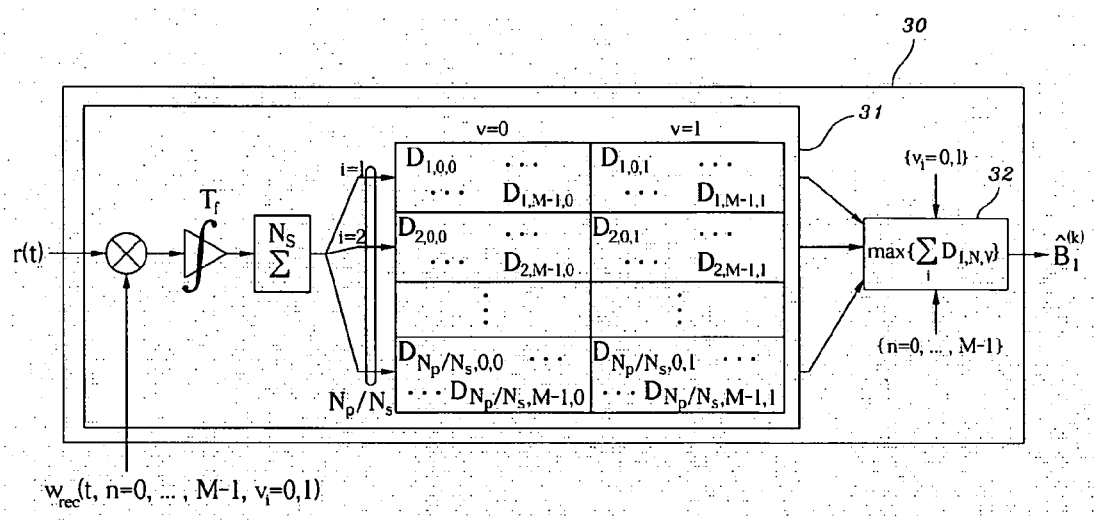

[Figure 6]

| $\hat{T}$ \ $\hat{C}$ | $C_0$ | $C_1$ | $C_2$ | $C_3$ |
|---|---|---|---|---|
| 00 | $D_{1,0,0} + D_{2,0,0}$ | $D_{1,1,0} + D_{2,1,0}$ | $D_{1,2,0} + D_{2,2,0}$ | $D_{1,3,0} + D_{2,3,0}$ |
| 01 | $D_{1,0,0} + D_{2,0,1}$ | $D_{1,1,0} + D_{2,1,1}$ | $D_{1,2,0} + D_{2,2,1}$ | $D_{1,3,0} + D_{2,3,1}$ |
| 10 | $D_{1,0,1} + D_{2,0,0}$ | $D_{1,1,1} + D_{2,1,0}$ | $D_{1,2,1} + D_{2,2,0}$ | $D_{1,3,1} + D_{2,3,0}$ |
| 11 | $D_{1,0,1} + D_{2,0,1}$ | $D_{1,1,1} + D_{2,1,1}$ | $D_{1,2,1} + D_{2,2,1}$ | $D_{1,3,1} + D_{2,3,1}$ |

[Figure 7]
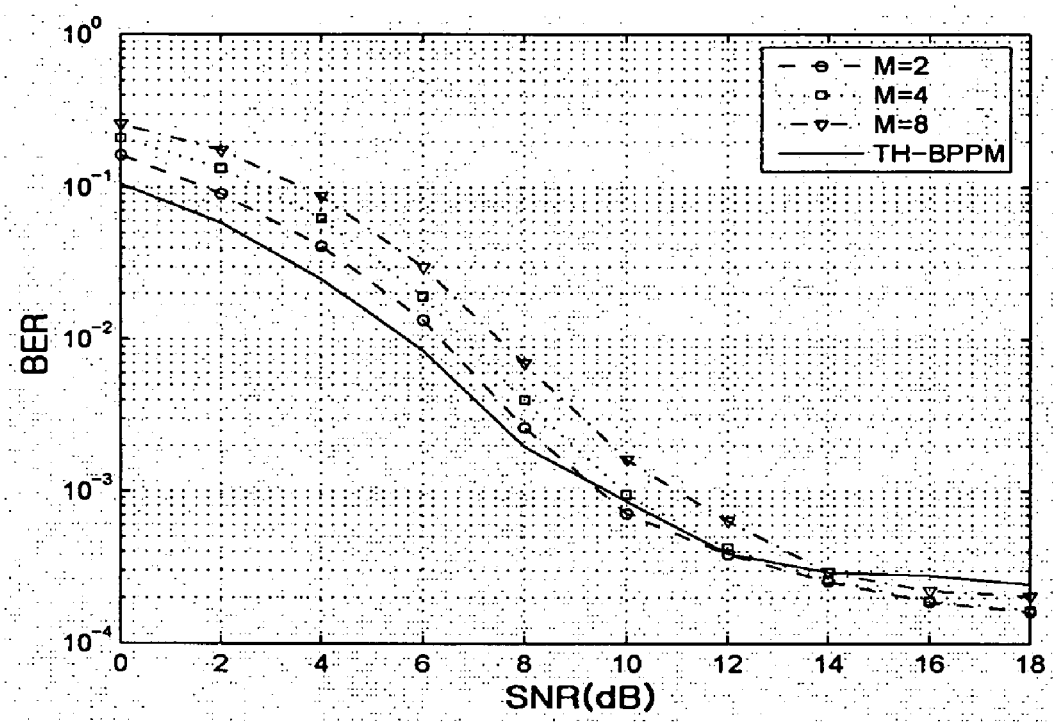

[Figure 8]
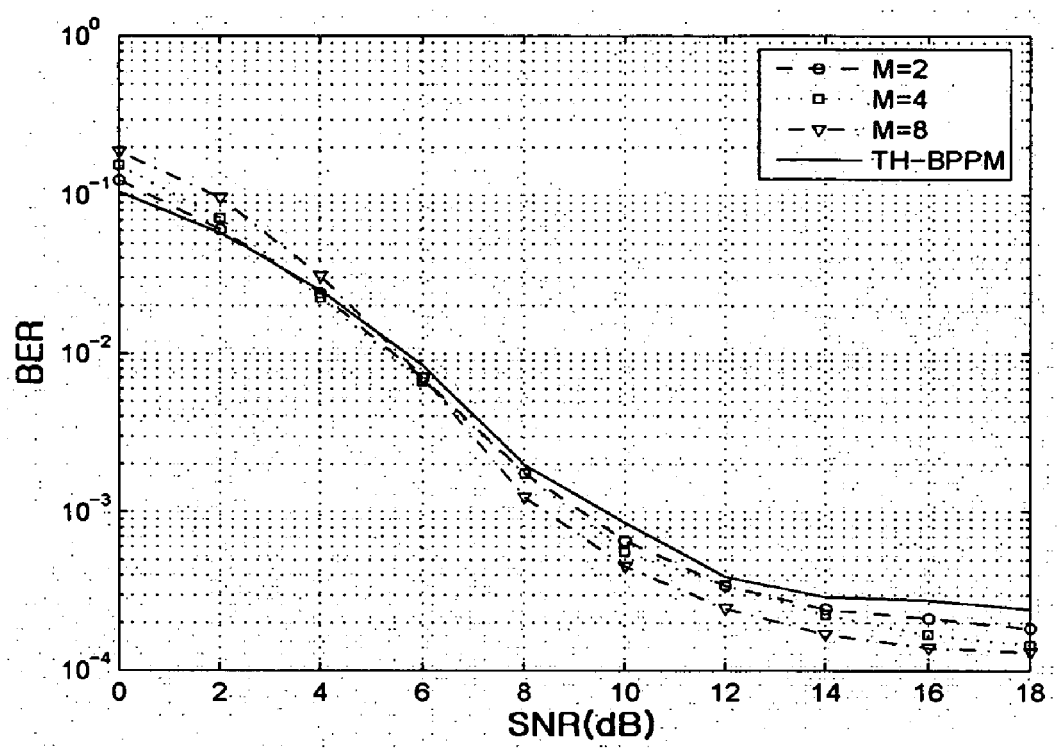

[Figure 9]
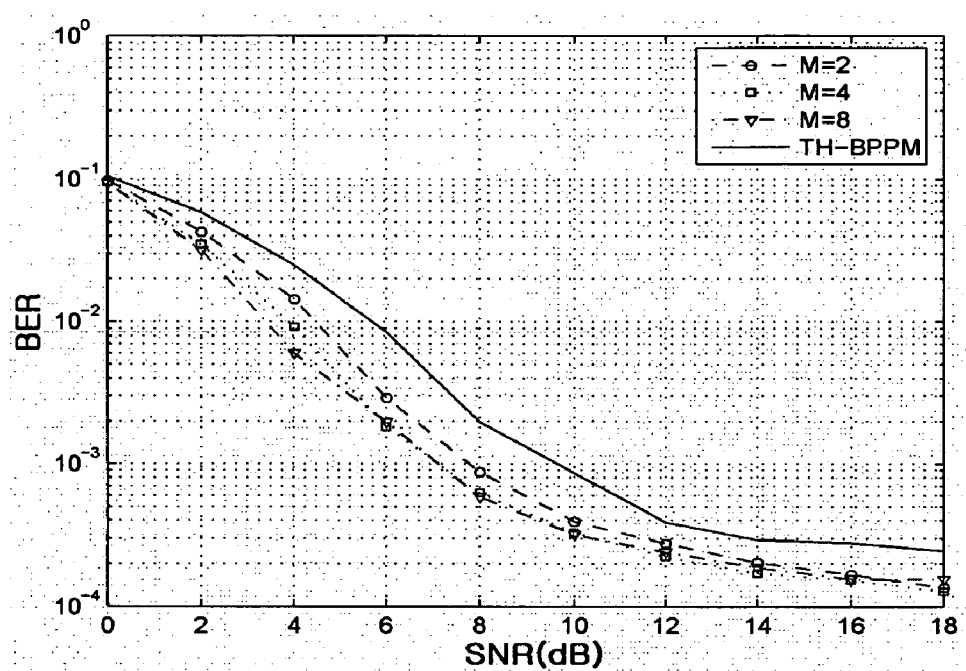

[Figure 10]
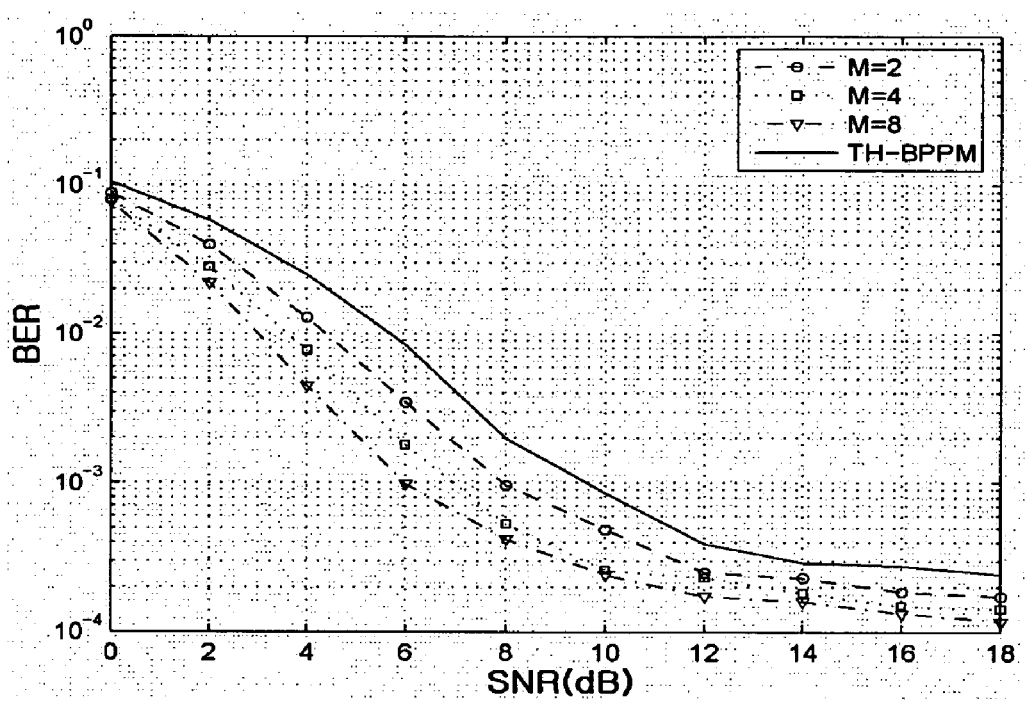

[Figure 11]
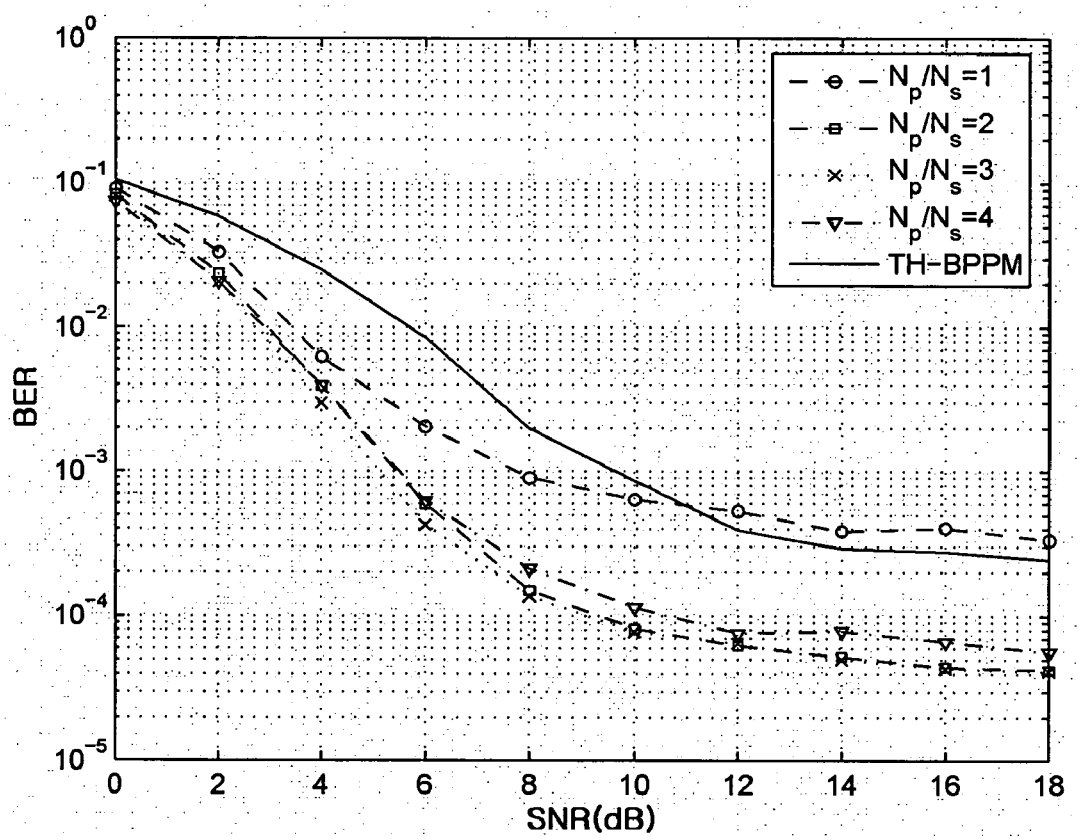

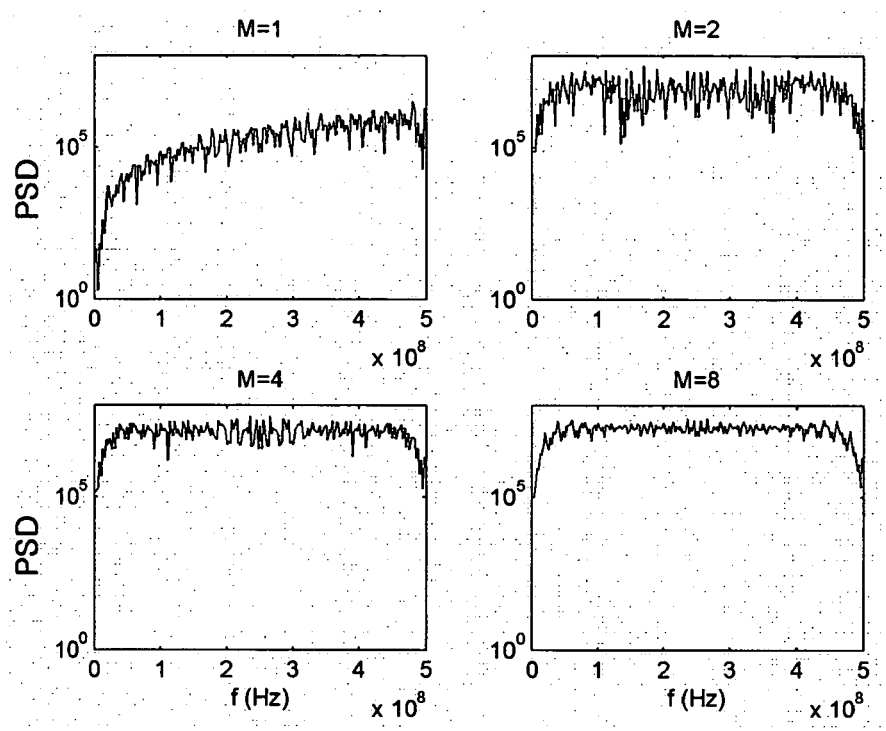
[Figure 12]

[Figure 13]
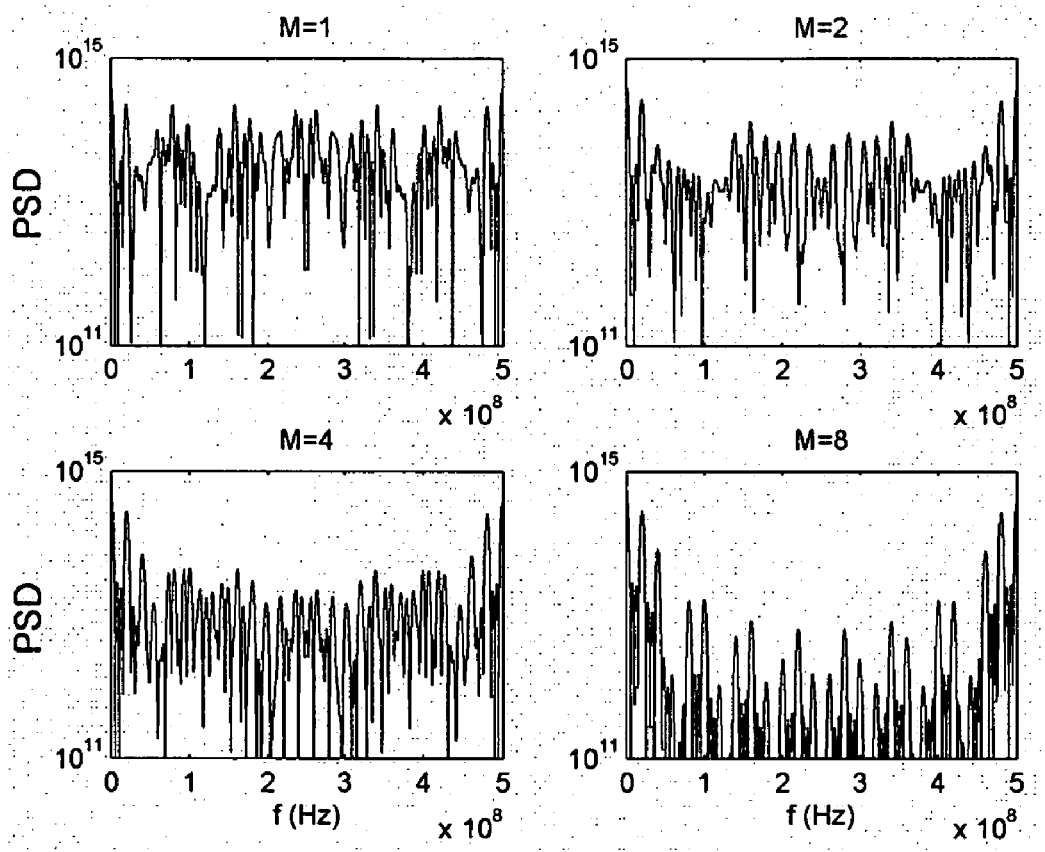

UWB MCSK/BPPM WIRELESS COMMUNICATION SYSTEM AND METHOD FOR INCREASED INFORMATION RATE

BACKGROUND OF THE INVENTION

1. Field of the Invention

The present invention relates generally to an ultra wideband wireless communication system and, more particularly, to an ultra wideband M-ary Code Shift Keying/Binary Pulse Position Modulation wireless communication system and method, in which a Binary Pulse Position Modulation scheme combined with an M-ary Code Shift Keying scheme is applied to the modulation of ultra wideband signals, thus improving the information rate.

2. Description of the Related Art

Recently, the rapid development of wireless communication technology and the popularization of wireless devices have significantly influenced humans' lifestyles. In particular, research into Ultra Wideband (UWB) communication that can coexist with conventional wireless communication service without the need for separate frequency resources and perform high-speed wideband wireless communication has been actively carried out.

UWB communication based on impulse radio technology receives and transmits data using short pulses (Gaussian monocycle), and has a wide bandwidth of several GHz when viewed in the frequency domain, since very short pulses are used.

Such UWB communication is advantageous in that low power is consumed because it transmits and receives data without using a carrier, unlike conventional communication, and it can be used without affecting other devices because it uses an ultra wideband and, therefore, signals are detected at a level lower than the noise level in the frequency domain.

Meanwhile, UWB is also advantageous in that the duty cycle of pulses is very low, so that the transmission rate is very low, multiple access is possible and the influence of interference attributable to multipath can be suppressed.

Although UWB may be applied to various fields, current principal research focuses on high-speed local area communication in a range of from about several to about several dozens of meters. Since UWB communication can deal with high-speed data transmission and reception, ultrahigh quality images, such as digital high vision broadcasting or Digital Versatile Disk images, can be transmitted in a streaming fashion.

Such UWB technology is a promising solution to indoor short-range wireless communication and a UWB system can effectively deal with multipath, so that the UWB technology can support both a large amount of data and multiple access performance.

The reason for using the UWB system is that the UWB system has a structure superior to a conventional system due to low power per unit bandwidth or low power radiation and is implemented in a simple structure, so that it is easy to generate signals.

Time Hopping Pulse Position Modulation (TH-PPM), a currently used modulation scheme, can support the above-described requirements. However, research into interference occurring in conventional systems has been continuously carried out so as to further increase the data rate while maintaining the same multiple access performance and minimizing interference occurring in conventional narrowband systems.

The improvement of the above-described problem should not violate the spectral mask requirements specified in "First UWB Report and Order" issued by the Federal Communications Commission (FCC) or affect the implementation of the low complexity of a system.

The conventional TH-PPM system modulates 1-bit data using Binary Pulse Position Modulation (BPPM), and reduces catastrophic collisions attributable to multipath using a user-specific TH code.

There have been many attempts to increase the data rate by changing the system based on such a basic structure.

Two current main approaches focus on either the transmission of different pulse shapes or the modification of modulation format.

The first approach is referred to as Pulse Shape Modulation (PSM), and is based on the transmission of orthogonal modified Hermite Pulses using BPPM. In this system, each user is assigned a set of orthogonal pulses. The generation of such a set of orthogonal pulses is based on the differentiation of pulses.

Accordingly, when the size of the set increases, the zero-crossing rate of pulses increases. This requires additional hardware that generates pulses. Furthermore, zero-crossing is increased due to the generation of such pulses, so that the complexity of the hardware is increased, thus limiting the size of the orthogonal set and, therefore, limiting the data rate.

By using PSM, the size of the orthogonal set is increased and, therefore, the data rate (which does not affect multiple access performance) is increased, in which case each pulse of the set exhibits various spectral characteristics. This requires different antenna structures at a receiver and violates the spectral mask requirements.

Furthermore, an increase in data rate results in a degradation in Bit Error Rate (BER) performance, which can be overcome using channel coding. In this case, the transmission of redundant bits is required, so that the data rate can be reduced.

The second approach is based on the modification of the BPPM format to M-ary PPM (MPPM). If the pulse is shifted to M different locations, multiple access performance is reduced for a fixed bandwidth when the data rate increases.

When MPPM is employed, the same BER performance can be obtained for an increased data rate while the number of users is reduced.

Accordingly, the increased data rate based on the same BER performance is limited by the number of users (or multiple access performance) that should be accommodated in the system. Otherwise, transmission bandwidth must be increased at the expense of an increase in data rate.

SUMMARY OF THE INVENTION

Accordingly, the present invention has been made keeping in mind the above problems occurring in the prior art, and an object of the present invention is to provide a UWB MCSK/BPPM wireless communication system and method that is capable of increasing the data rate through the transmission of additional information without altering the principal structure of a TH-PPM system, using MCSK based on user-specific TH codes.

In order to accomplish the above object, the present invention provides a UWB MCSK/BPPM wireless communication system, including a transmitter for selecting a specific TH code using MCSK according to an additional data stream, performing BPPM on a desired signal according to the selected TH code, and transmitting the modulated signal via a channel; and a receiver for receiving the signal transmitted from the transmitter via the channel, and estimating the transmitted signal, which is transmitted from the transmitter, through detection of a Maximum Likelihood (ML) sequence.

The transmitter includes an MCSK means for selecting the specific TH code according to the additional data stream, and a TH-BPPM means for performing pulse position modulation on the primary input information using the TH code selected by the MCSK means, whereas the receiver includes a decision variable formation means for forming decision variables that are used to estimate the signal transmitted via the channel, and a detection means for detecting an estimate of the signal from output of the decision variable formation means.

In addition, the present invention provides a UWB MCSK/BPPM wireless communication method, including the steps of generating TH code for each user; selecting a specific TH code according to an additional data stream using an MCSK module; performing BPPM on a desired signal according to the selected TH code and transmitting the modulated signal; and receiving the transmitted signal and estimating original data through detection of the ML sequence.

In the present invention, the generation of the TH code is controlled using the period of the TH code and the number of TH codes. The data rate of the transmitted signal is controlled using the period of the TH code and the number of bits transmitted with BPPM using this code.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram showing a UWB MCSK/BPPM wireless communication system according to the present invention;

FIG. 2 is a detailed diagram showing the transmitter of FIG. 1;

FIG. 3 is a diagram showing information transmitted in the present invention;

FIG. 4 is a diagram illustrating the assignment of TH codes to users in the present invention;

FIG. 5 is a detailed diagram showing the receiver of FIG. 1;

FIG. 6 is a diagram illustrating the detection process of the receiver of FIG. 5;

FIGS. 7 to 11 are graphs showing the results of BERs depending on the variable length of TH codes and the variable number of TH codes;

FIG. 12 is a graph showing the distribution of continuous signal power spectra of the conventional TH-BPPM scheme and the scheme of the present invention; and FIG. 13 is a graph showing the distribution of discrete signal power spectra of the conventional TH-BPPM scheme and the scheme of the present invention.

DESCRIPTION OF THE PREFERRED EMBODIMENTS

Reference now should be made to the drawings, in which the same reference numerals are used throughout the different drawings to designate the same or similar components.

A preferred embodiment of the present invention is described in detail with reference to the accompanying drawings. However, the following embodiment is illustrative of the present invention, and the present invention is not limited by the embodiment.

The present invention is based on the concept of increasing a data rate by applying the concept of the thesis "D. I. KIM, 'Combined binary pulse position modulation/biorthogonal modulation for direct-sequence code division multiple access,' IEEE Trans. Comm., vol. 47, No. 1, pp. 22-26, Jan. 1999" that was proposed for a Direct-Sequence Code-Division Multiple-Access (DS-CDMA) system, to a TH-PPM UWB system.

This is achieved by transmitting additional data, which are embedded in user-specific TH codes, using BPPM. A modulation system based on the new concept is referred to as a combined MCSK/BPPM in the present invention. The present invention proposes a solution that increases the amount of information for a UWB communication system without affecting signal space or the spectrum thereof.

FIG. 1 is a block diagram showing a UWB BPPM/MCSK wireless communication system for increasing an information rate in accordance with the present invention.

As shown in FIG. 1, the present invention includes a transmitter 10, a channel 20, that is, a model that affects transmitted signals, and a receiver 30. The transmitter 10 selects user-specific TH code using MCSK, performs BPPM on desired signals according to the selected TH code and transmits the modulated signals via the channel 20, and the receiver 30 receives the signals transmitted from the transmitter 10 via the channel 20 and estimates the signals transmitted from the transmitter 10.

In the system of the present invention, $B_l^{(k)}$ is the lth symbol of the kth user that is transmitted and input to the transmitter 10. $S_{tr}^{(k)}(t)$, which is output from the transmitter 10, is a UWB signal transmitted via the channel 20.

The channel 20 represents the effects of other users, transmitting and receiving antennas, and noise. The output r(t) of the channel 20 is the input to the receiver 30. The receiver 30 is affected by the channel 20 and outputs an estimate $\hat{B}_l^{(k)}$ of $B_l^{(k)}$.

FIG. 2 shows the detailed construction of the transmitter 10. The transmitter 10 includes an MCSK module 11 for selecting a single TH code using additional $\log_2 M$ input information bits (M: the number of TH codes available for each user), and a TH-BPPM module 12 for performing pulse position modulation on the primary input information using the TH code selected by the MCSK module 11. Reference numeral 13 designates a series/parallel converter. In this case, the TH-BPPM module 12 includes a plurality of TH-BPPM module 12-1, 12-2, . . . , and 12-n that are each mapped to 1-bit input information.

When the transmitter 10 transmits the first symbol of the kth user, $B_1^k = \{d_i | i=1, \ldots, \log_2 M + N_p/N_s\}$ where $d_i \in \{0, 1\}$; M is the number of TH codes available for each user, $N_p$ is the period of TH codes, and $N_s$, is the number of pulses used to transmit a single bit. Since TH codes should not occur more than once in a bit time, $N_p > N_s$.

Assuming that $T_1^{(k)} \subset B_1^{(k)}$ and $C_1^{(k)} \subset B_1^{(k)}$, $T_1^{(k)} = \{d_1, \ldots, d_{(N_p/ns)}\}$ is a set of bits that is transmitted using the TH-BPPM module 12, and $C_1^{(k)} = \{d_{(N_p/N_s)+1}, \ldots, d_{(N_p/N_s)+\log_2 M}\}$ is input to the MCSK module 11 so as to obtain the index n of the user-specific TH code $C_n^{(k)}$.

The relationship between n and $C_n^{(k)}$ is expressed by the following Equation:

$$(n)_{10} = (d_{(N_p/N_s)+1} d_{(N_p/N_s)+2} \cdots d_{(N_p/N_s)+\log_2 M})_2, \quad (1)$$

where $(.)_x$ represents base x. Using Equation 1, the output index of the MCSK module 11 is determined, the TH code $C_n^{(k)}$ is selected from $\{C_i^{(k)} | i=0, \ldots, M-1\}$ and $T_1^{(k)}$ is transmitted.

For M=1 that represents a single TH code for each user, the present invention is the same as the conventional TH-PPM.

The UWB signal, which transmits the ith bit of kth user and is generated using conventional TH-BPPM, can be expressed by the following Equation:

$$s_{tr}^{(k)}(t) = \sum_{j=iN_a}^{(i+1)N_a - 1} w_{tr}(t - jT_f - (c_0^{(k)})_j T_c - d_i^{(k)}\delta), \quad (2)$$

where $w_{tr}(t)$ is a pulse transmitted at a pulse width of $T_p$, and $T_f$ is a frame time required for the transmission of a single pulse. $\{(c_o^{(k)})_j\}$ represents the kth user's TH code consisting of integers, and satisfies $0 \leq (c_o^{(k)})_j < N_h$ and $N_h T_c \leq T_f$ where $T_c$ is a chip time. The chip time is the minimal time that the TH code takes, is the time within which interference can be ignored when the pulses of two different users collide with each other, and is set to a value that is slightly greater than the width $T_p$ of a pulse.

$d_i^{(k)}$ is the ith binary data for the kth user and $\delta$ is the time shift parameter of the TH-BPPM module 12. One-bit data is transmitted every $N_s T_f$ seconds using the modulation format where the information rate is represented by $R_b = 1/N_s T_f$.

One-bit data is transmitted via the TH-BPPM module 12-1, whereas additional $\log_2 M$-bit data select a specific TH code from among a set of M user-specific TH codes (where M>1).

For $N_p/N_s > 1$, the same TH code is used until $N_p$ pulses are transmitted. This implies that the TH-BPPM module 12 effectively transmits Np/Ns bits using the TH code selected by the $\log_2 M$-bit data.

Accordingly, a total of $(\log_2 M + N_p/N_s)$ bits are transmitted via the TH-BPPM module 12 during the transmission of $(N_p/N_s)$ bits, as described in FIG. 3 (in FIG. 3, the additional information is C and primary information is T).

The resulting increased information rate is represented by the following Equation:

$$R_s = \left(1 + \frac{\log_2 M}{(N_p/N_s)}\right) R_b. \quad (3)$$

To maintain the same bit energy $E_b$ (energy mode) for different M values and the ratio $N_p/N_s$, the amplitude of the transmitted signal should increase $w_{tr}(t)$ $G = \sqrt{R_s/R_b}$ times. On the other hand, keeping G=1, the transmit power per unit time is made equal to that of TH-BPPM (power mode). The signal that transmits the set $T_1^{(k)}$ using the TH code $C_n^{(k)}$ obtained using $C_1^{(k)}$ is represented by the following Equation:

$$s_{tr}^{(k)}(t) = G \sum_{i=1}^{N_p/N_a} \sum_{j=iN_a}^{(i+1)N_a - 1} w_{tr}(t - jT_f - (c_n^{(k)})_j T_c - d_i^{(k)}\delta) \quad (4)$$

The transmitted signal of the present invention is different from that of the conventional system in the two following aspects:

First, G exists in Equation 4, and represents an increase in amplitude due to a TH code period $N_p$ and the number of TH codes M (only for the energy mode).

Second, $C_n^{(k)}$ exists in Equation 4, and represents various TH codes used in the TH-BPPM module 12 for the kth user.

To enable multiple access by minimizing catastrophic collisions, $C_n^{(k)}$ for the kth user is as illustrated in FIG. 4.

As illustrated in FIG. 4, M TH codes are assigned to $N_u$ users using a binary maximal-length sequence (m-sequence).

First, the number of slots is selected to allow multiple access.

For example, when the sum of the pulse width $T_p$ and binary-shift parameter $\delta$ equals 1 ns in the frame $T_f$ having a length of 100 ns, a maximum of 100 slots can be assigned for multiple access.

When a binary m-sequence is converted into a decimal m-sequence, $N_h = 100$ wherein $2^l = N_h$. Accordingly, $N_h = 64$ and l=6. Then, the binary m-sequence is converted to the decimal sequence by finding a decimal number that coincides with a corresponding bit block. In this case, l=6 is selected for FIG. 4.

Thereafter, a TH code is acquired from the decimal m-sequence, and the decimal m-sequence is assigned to the user. $\{c_0^{(1)}\}$ is assigned to a first user, and $\{c_1^{(1)}\}$ is assigned to a second user.

The above-described process is repeated until $\{c_{M-1}^{1}\}$ is assigned to a final user and, therefore, all of M TH codes are assigned to all users.

While $N_p/N_s$ bits are transmitted, each user can transmit one of the TH codes. The partial overlapping within the TH codes is allowed, and the collision of TH codes is impossible while one symbol persists.

A TH code starting from the next number that is not assigned to the previous user's code is assigned to the next user, as illustrated in FIG. 4 for $N_p = 4$, M=4 and a given binary m-sequence. This process is repeated until M TH codes are assigned to all $N_u$ users.

The conventional TH-PPM system uses $N_p N^u$ numbers of a decimal m-sequence, whereas the MCSK/BPPM system of the present invention uses $(N_p + M - 1) N_u$ numbers. To improve the multiple access performance, a TH code set should be designed such that each user's TH codes do not overlap within a frame time.

The transmitted signal $s_{tr}^{(k)}(t)$ may interfere with those of other users, and is affected by the reception antenna in the channel 20.

$$I_{tr}(t) = \sum_{l=1, l\neq k}^{N_u} s_{tr}^{(l)}(t - \tau_l) \quad (5)$$

Equation (5) represents interfering users where $\tau_l$, is delay that represents time asynchronism between users.

The receiving antenna acts as a time-domain differentiator for the basic pulse $w_{tr}(t)$ of $s_{tr}^{(k)}(t)$, thus resulting in $W_{rec}(t)$ Then, the received signal can be expressed by the following Equation:

$$r(t) = \sum_{l=1}^{N_u} A_l s_{rec}^{(l)}(t - \tau_l) + n(t), \quad (6)$$

where $A_l$ is a channel attenuation parameter, $S_{rec}^{(k)}(t)$ is the kth user's received signal, and n(t) is an additive white Gaussian noise.

The receiver 30 includes two units, as shown in FIG. 5.

As shown in FIG. 5, the receiver 30 includes a decision variable formation unit 31 for forming decision variables used to estimate $B_i^{(k)}$, that is, a user signal into which the output (r(t)) of the channel 20 is modulated in the receiver 10 and that is transmitted, and a detection unit 32 for detecting a estimate $\hat{B}_I^{(k)}$ of $B_I^{(k)}$ from the output of the decision variable formation unit 31.

The decision variable formation unit 31 includes a correlator, an integrator and an accumulator, and the detection unit 32 includes an accumulator and a comparator.

According to the structure shown in FIG. 5, the receiver 30 computes the correlation between the received signal r(t) and the template signal $w_{rec}(t)$ for M different TH codes and both values of binary data for each bit in a symbol using the decision variable formation unit 31.

When $\{D_{i,n,v_i}^{(k)}\}$ is the output values of the decision variable formation unit 31 for the ith bit of the kth user, it is calculated for the values of $\{i=1, \ldots, N_p/N_s; n=0, \ldots, M-1; v_i=0, 1\}$ for $$D_{i,n,v_i}^{(k)} = \sum_{j=iN_a}^{(i+1)N_a-1} \int_{\tau_k+jT_f}^{\tau_k+(j+1)T_f} r(t) \times w_{rec}(t - \tau_k - jT_f - (c_n^{(k)})_j T_c - v_i \delta) dt. \quad (7)$$

$N_p/N_s$ binary bit values for M TH codes are calculated and stored in the decision variable formation unit 31.

To calculate $T_1^{(k)}$ and $C_1^{(k)}$, $\{D_{i,n,vi}^{(k)}\}$ is input to the detection unit 32.

The number of possible output values of the sequence $T_I^{(k)}$ for each TH code that transmits $N_p/N_s$ bits is $2^{Np/Ns}$. The detection unit 32 can acquire a transmission sequence corresponding to each TH code by acquiring the sum of $\{D_{i,n,v_i}^{(k)}\}$ using a Maximum-Likelihood (ML) sequence detector.

$$L_1^{(k)}(n, v) = \sum_{i=1}^{N_p/N_a} D_{i,n,v_i}^{(k)} \quad (8)$$

Equation (8) is referred to as the decision values for the first symbol.

In Equation (8), $n=\{0, \ldots, M-1\}$, $v=[v_1 v_2 \ldots v_{(Np/ns)}]$, and $v_i \in \{0, 1\}$ with $2^{(Np/Ns)}M$ outputs. The sets $T_I^{(k)}$ and $C_I^{(k)}$ are estimated by selecting a decision variable that gives the maximum value.

$$\max\{L_1^{(k)}(n, v)\} \Rightarrow n \Rightarrow \hat{C}_1^{(k)}, \quad (9)$$
$$\Rightarrow v \Rightarrow \hat{T}_1^{(k)},$$
$$\Rightarrow [\hat{T}_1^{(k)} | \hat{C}_1^{(k)}] \Rightarrow \hat{B}_1^{(k)}.$$

FIG. 6 illustrates a process of detecting $\hat{T}$ and $\hat{C}$ for $N_p/N_s=2$ and M=4. The table of FIG. 6 shows the accumulated values of the detection unit 32. Each row corresponds to a different transmitted bit-sequence, and each column corresponds to a specific TH code being used to transmit the sequence.

$\hat{C}$ is associated with the index n of $C_n$. The table consists of $2^{Np/Ns}M$ input values. Then, the comparator (not shown) of the detection unit 32 compares input values and finds the maximum value. $\hat{T}$ is determined using the row index having the maximum value and $\hat{C}$ is determined using the column index. The output of the receiver 30 is then $\hat{B}=[\hat{T}|\hat{C}]$.

For the performance comparison of the conventional TH-PPM and MCSK/BPPM modulation systems, BER performance is investigated at various information rates determined by M and $N_p/N_s$.

The received pulse $w_{rec}(t)$ is assumed to be the second derivative of a Guassian monocycle given by the following Equation:

$$w_{rec}(t)=(1-4\pi(t/\tau_m)^2)\exp(-2\pi(t/\tau_m)^2), \quad (10)$$

where $\tau_m=0.2877$ ns. $\delta=0.156$ ns is selected to maximize the performance of the conventional TH-PPM.

FIG. 7 is a graph showing the comparison of the BERs of the conventional TH-BPPM scheme and the MCSK/BPPM scheme of the present invention under the condition that the power of a signal is maintained at a constant level (power mode). FIG. 7 is a graph showing the results of the evaluation of BERs on the assumption that the period of the TH code $N_p=2N_s$ ($N_s$ is the number of frames per symbol). In general, when the power of the signal is maintained at a constant level, SNR decreases when the number of symbols M is increased, so that the present invention does not significantly improve performance compared to the conventional scheme.

FIG. 8 is a graph showing the comparison of the BERs of the conventional TH-BPPM scheme and the MCSK/BPPM scheme of the present invention under the condition that the power of a signal is maintained at a constant level. FIG. 8 represents the results of the evaluation of BERs on the assumption that the period of TH code $N_p=4N_s$ ($N_s$ is the number of frames per symbol). In general, when the period of the TH code $N_p$ is increased, the signal observation time of the ML detector increases, thus improving detection characteristics. Accordingly, the BER of the newly proposed MCSK/BPPM scheme is further improved compared to that of FIG. 7. Furthermore, in the case where SNR increases, the decrease of SNR due to the increase of M is somewhat compensated for, so that it can be observed that the degree of improvement considerably increases with the increase of M.

FIG. 9 is a graph showing the comparison of the BERs of the conventional TH-BPPM scheme and the MCSK/BPPM scheme of the present invention under the condition that the energy of a signal per bit is maintained at a constant level (energy mode). FIG. 9 represents the results of the evaluation of BERs on the assumption that the period of TH code $N_p=2N_s$ ($N_s$ is the number of frames per symbol). In general, when the energy of the signal per bit is maintained at a constant level, SNR increases in proportion to the increase of the number of symbols M, so that it can be observed that the MSCK/BPPM scheme has a considerable improvement in performance compared to the conventional TH-BPPM scheme from the comparison of FIGS. 7 and 8.

However, a problem arises in that, when M is increased while the energy per bit is kept constant, the amplitude of the signal increases in proportion to the increase of M, so that the power of the signal increases. When a frame time is increased, the average power of the signal decreases, so that the above-described problem can be overcome. In this case, an increase in frame time may reduce the data rate, so that the improvement in performance can be maintained by appropriately selecting the frame time.

FIG. 10 is a graph showing the comparison of the BERs of the conventional TH-BPPM scheme and the MCSK/BPPM scheme of the present invention under the condition that the energy of a signal per bit is maintained at a constant level. FIG. 10 represents the results of the evaluation of BERs on the assumption that the period of TH code $N_p=4N_s$ ($N_s$ is the number of frames per symbol). In general, when the period of the TH code $N_p$ is increased, the signal observation time of the ML detector increases, thus improving detection characteristics. Meanwhile, this is combined with the decrease of SNR due to the increase of $N_p$ and, therefore, it can be observed that the performance is slightly improved compared to that of FIG. 9.

FIG. 11 is a graph showing the comparison of the BERs of the conventional TH-BPPM scheme and the MCSK/BPPM scheme of the present invention under the condition that the power of a signal and the data rate are kept constant. FIG. 11 represents the results of the evaluation of BERs on the assumption that the number of symbols M=8 and the periods of TH code $N_p=N_s$, $2N_s$, $3N_s$ and $4N_s$ ($N_s$ is the number of frames per symbol). When the data rate is kept constant, the frame time and the amplitude of the signal increase in proportion to M, but decreases in inverse proportion to $N_p/N_s$. In this case, the detection characteristics of the ML detector can be improved by increasing the period of the TH code $N_p$ in a low SNR region, and the frame time can be lengthened by decreasing the period of the TH code in a high SNR region and, therefore, the effect of the interference due to the collisions of signal pulses can be reduced, thus improving BER performance.

In FIG. 12, M=1 shows the distribution of a continuous signal power spectrum of the conventional TH-BPPM scheme, and M=2, 4 and 8 show the distribution of continuous signal power spectra. From FIG. 12, it can be observed that the distribution of the spectrum becomes uniform as M increases. The reason for this is that, as M increases, the randomness of the TH code selected for each symbol in the MCSK/BPPM scheme increases, so that the spectrum of the signal is spread out over an entire band and becomes more uniform. Accordingly, it can be observed from FIG. 12 that the MCSK/BPPM scheme can improve the distribution characteristics of the continuous spectrum compared to the conventional scheme.

In FIG. 13, M=1 shows the distribution of a discrete signal power spectrum of the conventional TH-BPPM, and M=2, 4, 8 show the distribution of discrete signal power spectra of the MCSK/BPPM scheme. From FIG. 13, it can be observed that, as M increases, the discrete spectra are suppressed. The reason for this is that, as M increases, the randomness of the TH code selected for each symbol in the MCSK/BPPM scheme increases and, therefore, the effective period of the TH code is actually increased, so that the minimum spacing between the two discrete spectrum components is reduced accordingly, thus suppressing the discrete spectrum in the case where the power of the signal is kept constant. As a result, it can be observed from FIG. 13 that the MCSK/BPPM scheme can considerably improve the distribution characteristics of the discrete spectrum compared to the conventional scheme.

Accordingly, the MCSK/BPPM wireless communication system of the present invention can achieve the increased data rate with superior BER performance and same multiple access capability, and conforms to the FCC's spectral mask requirements by improving the spectrum shaping of the TH-PPM signal. Furthermore, the present invention consumes low transmission power and exhibits superior performance compared to the conventional TH-PPM system.

As described above, although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Ultra WideBand M-ary Code Shift Keying/Binary Pulse Position Modulation wireless communication system, comprising:
   a transmitter including: M-ary Code Shift Keying means for selecting a user-specific M time-hopping code according to an additional data stream, and time-hopping Binary Pulse Position Modulation means for performing pulse position modulation on primary input information using the user-specific M time-hopping code selected by the M-ary Code Shift Keying means, wherein the Binary Pulse Position Modulation means comprises a plurality of time-hopping Binary Pulse Position Modulation modules that each corresponds to 1-bit input information, wherein the transmitter transmits a modulated signal via a channel; and
   a receiver for receiving the signal transmitted from the transmitter via the channel, including: decision variable means, which are composed of combinations of user-specific M time hopping code and binary position information and used for forming decision variables by computing a correlation between the received transmitted signal and a template signal for M different user-specific M time-hopping codes and both values of binary data for each bit in a symbol and the decision variables are used to estimate the signal transmitted via the channel, and detection means for detecting an estimate of decision variables from an output of the decision variable formation means.

2. The Ultra WideBand M-ary Code Shift Keying/Binary Pulse Position Modulation wireless communication system as set forth in claim 1, wherein the user-specific M time-hopping code has a period, and wherein generation of the user-specific M time-hopping code is controlled using the period of the user-specific M time-hopping code.

3. The Ultra WideBand M-ary Code Shift Keying/Binary Pulse Position Modulation wireless communication system as set forth in claim 1, wherein generation of the user-specific M time-hopping code is controlled using a number of user-specific M time-hopping codes.

4. The Ultra WideBand M-ary Code Shift Keying/Binary Pulse Position Modulation wireless communication system as set forth in claim 1, wherein the user-specific M time-hopping code has a period, and wherein a data rate of the transmitted signal is controlled using the period of the user-specific M time-hopping code.

5. The Ultra WideBand M-ary Code Shift Keying/Binary Pulse Position Modulation wireless communication system as set forth in claim 1, wherein the additional data stream is $\log_2 M$ (where M is the number of time-hopping codes available for each user) input information bits.

6. An Ultra WideBand M-ary Code Shift Keying/Binary Pulse Position Modulation wireless communication method, comprising the steps of:
   generating a user specific M time-hopping code for each user, wherein the user specific M time-hopping code has a period, and wherein generation of the user specific M time-hopping code is controlled using the period of the user specific M time-hopping code;
   selecting one user-specific M time-hopping code according to an additional data stream using an M-ary Code Shift Keying module;
   performing Binary Pulse Position Modulation on a desired signal according to the selected user specific M time-hopping code to obtain additional data bits which are embedded in the user-specific M time-hopping code to produce a modulated signal, and transmitting the modulated signal;

receiving the transmitted modulated signal; and estimating original data variables by computing a correlation between the received signal and a template signal for M different user specific M time-hopping codes and both values of binary data for each bit in a symbol and decision variables through detection.

7. The Ultra WideBand M-ary Code Shift Keying/Binary Pulse Position Modulation wireless communication method as set forth in claim 6, wherein generation of the user specific M time-hopping code is controlled using a number of user specific M time-hopping codes.

8. The Ultra WideBand M-ary Code Shift Keying/Binary Pulse Position Modulation wireless communication method as set forth in claim 6, wherein a data rate of the transmitted modulated signal is controlled using the period of the user specific M time-hopping code.

9. The Ultra WideBand M-ary Code Shift Keying/Binary Pulse Position Modulation wireless communication method as set forth in claim 6, wherein the additional data stream is $\log_2 M$ (where M is the number of time-hopping codes available for each user) input information bits.

* * * * *